United States Patent [19]

Frates et al.

[11] Patent Number: 5,353,945
[45] Date of Patent: Oct. 11, 1994

[54] THERMOPLASTIC MATERIAL MELTING APPARATUS

[75] Inventors: Paul S. Frates, Lawrenceville; Charles P. Ganzer, Cumming; Kenneth E. Rothrauff, Suwanee; Luis F. Pareja, Stone Mountain, all of Ga.

[73] Assignee: Nordson Corporation, Westlake, Ohio

[21] Appl. No.: 949,572

[22] Filed: Sep. 22, 1992

[51] Int. Cl.⁵ .................................................. B65D 45/00
[52] U.S. Cl. .................................. 220/314; 222/146.2; 222/146.5
[58] Field of Search ............. 220/469, 314, 255, 266, 220/4.12; 222/146.2, 146.5

[56] References Cited

U.S. PATENT DOCUMENTS

| | | | |
|---|---|---|---|
| 3,365,096 | 1/1968 | Muehl | 220/314 |
| 3,744,670 | 7/1973 | De Frees | 220/314 |
| 4,456,151 | 6/1984 | Lewellen | 222/146 HE |
| 4,485,942 | 12/1984 | Petrecca | 222/146.5 |
| 4,821,922 | 4/1989 | Miller et al. | 222/146.2 X |
| 4,883,200 | 11/1989 | Miller et al. | 222/77 |
| 4,919,308 | 4/1990 | Majkrzak | 222/146.5 |

Primary Examiner—Steven M. Pollard
Attorney, Agent, or Firm—Tarolli, Sundheim & Covell

[57] ABSTRACT

An apparatus for use in converting solid thermoplastic material to molten thermoplastic material includes a tank which receives the solid thermoplastic material and holds a body of molten thermoplastic material. A housing encloses the tank. The tank and housing have openings through which solid thermoplastic material enters the tank. A rim extends along the periphery of an upper wall of the housing. The rim has an upper edge portion which is disposed above the upper wall of the housing to enable the rim to block wash water and/or other liquids from flowing along the upper wall of the housing into the tank. A cover assembly is connected with the housing and is movable between an open condition and a closed condition blocking the open upper end portion of the tank. The cover assembly includes an inner cover which sealingly engages the upper edge portion of the rim and an outer cover which cooperates with the housing to enclose the inner cover.

24 Claims, 6 Drawing Sheets

THERMOPLASTIC MATERIAL MELTING APPARATUS

BACKGROUND OF THE INVENTION

The present invention relates to an apparatus for use in converting solid thermoplastic material to molten thermoplastic material to facilitate application of the thermoplastic material to an article.

A known apparatus for use in converting solid thermoplastic material to molten thermoplastic material, such as hot melt adhesives, includes a tank which is enclosed by a housing and receives the solid thermoplastic material. The solid thermoplastic material is melted by heaters connected with the tank. The molten thermoplastic material is conducted from the tank to dispensing guns which apply the molten thermoplastic material to articles. Some known designs for thermoplastic material melting apparatus are disclosed in U.S. Pat. Nos. 4,456,151; 4,485,942; and 4,883,200.

Maintaining the apparatus clean and free of bacteria is extremely important when the apparatus is to be used in association with the application of hot thermoplastic material to containers for food. Cracks and/or crevices in the housing may provide a place where bacteria may accumulate. To eliminate this accumulation of bacteria, it is common to wash the unit with cleaning agents. For example, it is common to literally hose down the unit. However, it is not uncommon in the dispensing or melting of hot melt adhesives to experience temperatures in the range from about 71° C. (160° F.) to about 232° C. (450° F.). It is therefore important to keep the cleaning solution from entering the tank during a wash down.

SUMMARY OF THE INVENTION

The present invention provides a new and improved apparatus for use in converting solid thermoplastic material to molten thermoplastic material to facilitate application of the thermoplastic material to an article. The apparatus includes a tank which holds the thermoplastic material and is enclosed by a housing. A cover assembly is connected with the housing and is movable between an open condition and a closed condition blocking an open upper end portion of the tank.

The cover assembly includes an inner cover which sealingly engages an upper end portion of a rim which extends upwardly from an upper wall of the housing. The rim prevents wash water and/or other liquids from entering the tank. An outer cover cooperates with the housing to enclose the inner cover.

The inner cover is pressed against an upper edge portion of the rim by a biasing spring. The inner cover can move relative to the outer cover, against the influence of the biasing spring, to vent excessive fluid pressure in the tank. As the cover assembly is closed, the inner cover is moved through a small distance relative to the outer cover to facilitate positioning the inner cover on the rim and to compress the spring to provide a uniform sealing force between the inner cover and the rim.

BRIEF DESCRIPTION OF THE DRAWINGS

The foregoing and other features of the invention will become more apparent upon a consideration of the following description taken in connection with the accompanying drawings, wherein.

DESCRIPTION OF ONE SPECIFIC PREFERRED EMBODIMENT OF THE INVENTION

Figure 1:
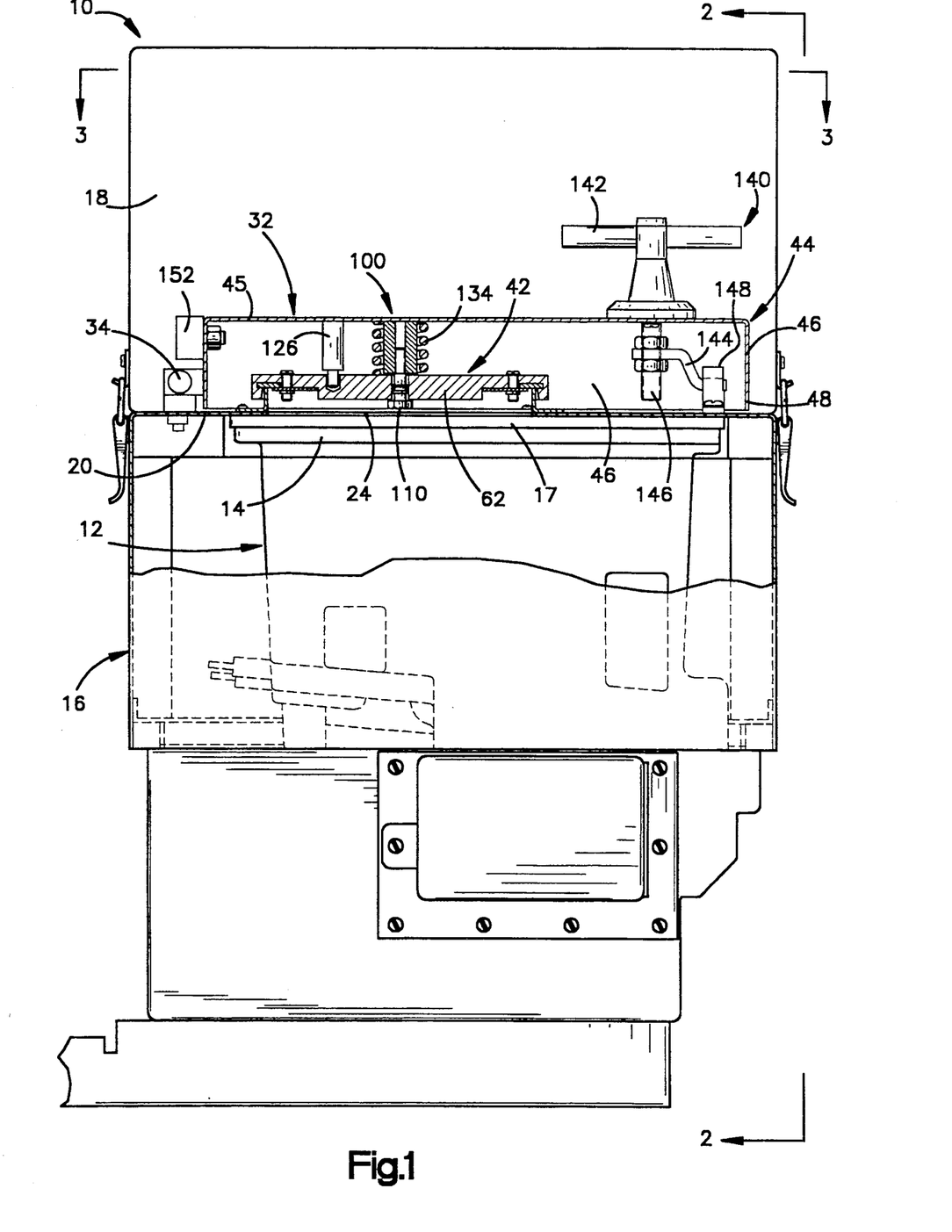
FIG. 1 is a front elevational view of an apparatus constructed in accordance with the present invention for use in converting solid thermoplastic material to molten thermoplastic material.
Figure 2:
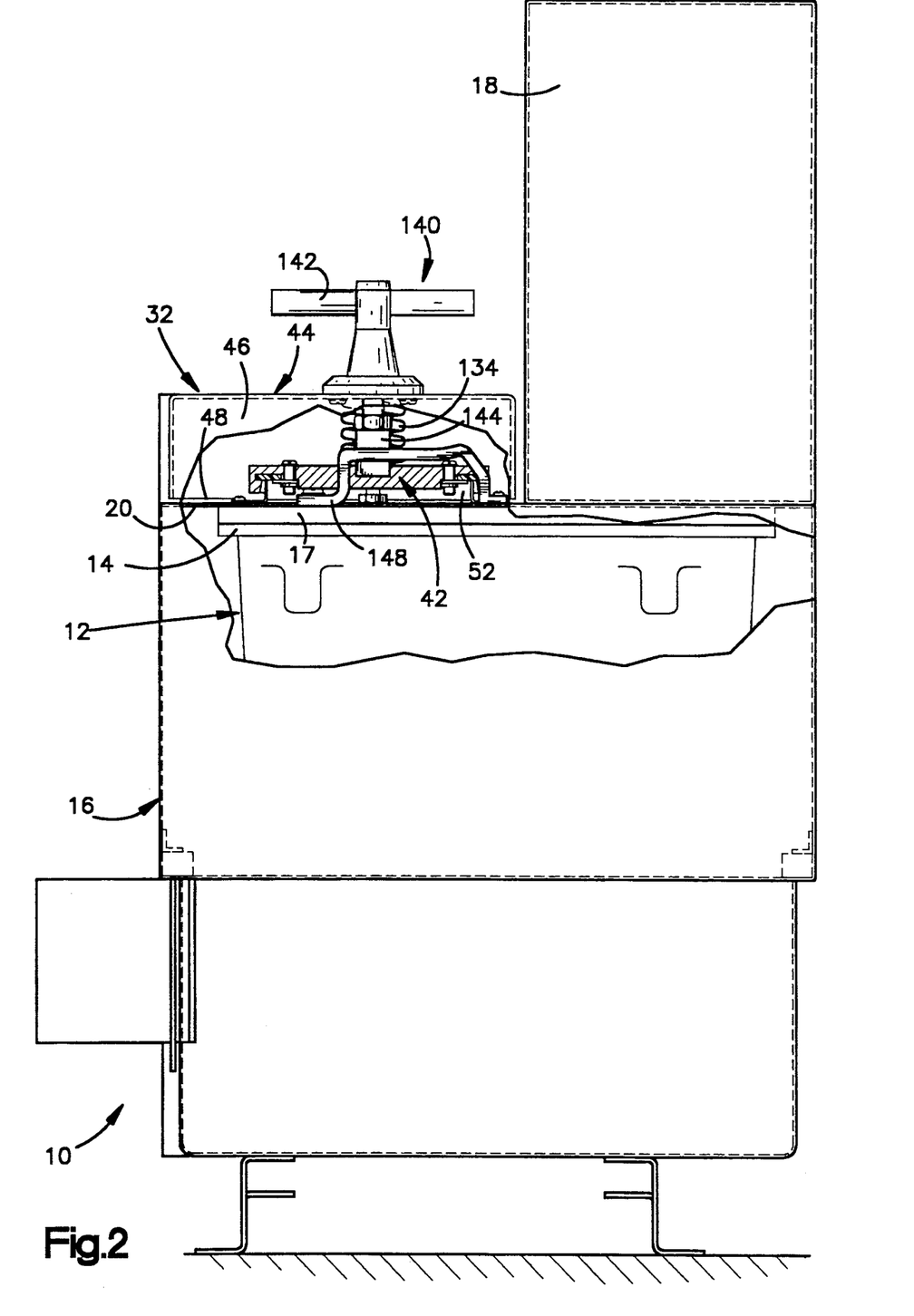
FIG. 2 is a side elevational view, taken generally along the line 2—2 of FIG. 1, further illustrating the construction of the apparatus.

An apparatus 10 for use in converting solid thermoplastic material to molten thermoplastic material is illustrated in FIGS. 1 and 2. The apparatus 10 includes a tank 12 which receives solid thermoplastic material and has heating elements which melt the thermoplastic material. The molten thermoplastic material is maintained in the tank 12, at a temperature, for example, in the range from about 160° to 450° F. The molten thermoplastic material is conducted from the tank 12 to suitable dispensing guns which apply the molten thermoplastic material to an article.

The apparatus 10 can be utilized in many different environments in association with the application of molten thermoplastic material to many different types of articles. However, it is contemplated that the apparatus 10 will be particularly useful in conjunction with the application of molten thermoplastic material to substrates for use in the food industry or the like. The tank 12 and the associated heaters have the same general construction as is disclosed in U.S. Pat. Nos. 4,456,151; 4,485,942; and 4,883,200.

The tank 12 has an open upper end portion 14. The upper end portion 14 of the tank 12 has a generally rectangular opening (not shown) through which solid thermoplastic material is moved into the tank. A stainless steel housing 16 encloses the tank 12. A generally rectangular isolator ring 17 is disposed between the upper end portion 14 of the tank 12 and the housing 16. An upwardly extending portion 18 of the housing 16 encloses a pump assembly which pumps molten thermoplastic material from the tank 12 to dispensing guns (not shown).

An upper wall 20 of the housing 16 has a rectangular opening 24 (FIGS. 3, 4 and 5) which is smaller than the generally rectangular opening formed by the upper end portion 14 of the tank 12. The upper end portion 14 of the tank 12 is sealed against a lower side 26 (FIG. 4) of the upper wall 20 of the housing 16 by the isolator ring 17. The isolator ring 17 engages the upper wall 20 of the housing 16 to prevent fumes from leaking between the upper end portion 14 of the tank 12 and the lower side surface 26 of the upper wall 20 of the housing 16.

Figure 3:
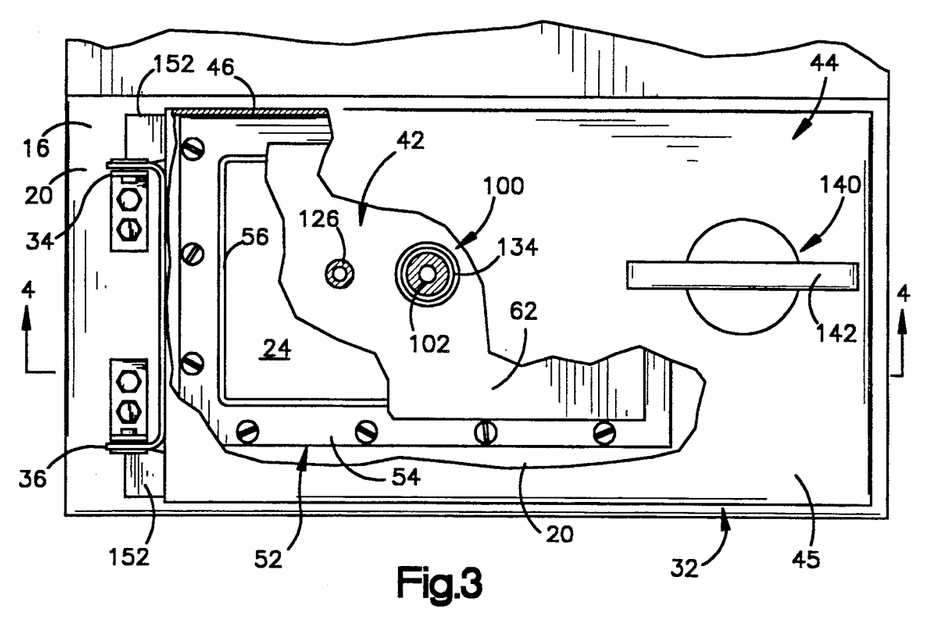
FIG. 3 is a fragmentary and partially broken away plan view, taken generally along the line 3—3 of FIG. 1, illustrating the construction of an improved cover assembly.

An improved cover assembly 32 is pivotally connected with the housing 16 by a pair of hinge assemblies 34 and 36 (FIGS. 1 and 3). The hinge assemblies 34 and 36 allow the cover assembly 32 to be pivoted in a counterclockwise direction from the closed position shown in FIG. 1 to an open position. When the cover assembly 32 is in the open position, it extends upwardly from the upper wall 20 of the housing 16 to provide access to the opening 24 through which solid pieces of thermoplastic material are manually moved into the tank 12. Once the solid pieces of thermoplastic material have been positioned in the tank 12, the cover assembly 32 is pivoted in a clockwise direction (as viewed in FIG. 1) from the open position back to the closed position. The cover assembly 32 has been shown partially broken away in FIG. 2 to better illustrate the construction of the cover assembly.

The cover assembly 32 includes an inner cover 42 which blocks the opening 24 (FIGS. 1 and 4) when the cover assembly 32 is closed. An outer cover 44 cooperates with the housing 16 to enclose the inner cover 42 when the cover assembly 32 is in the closed condition of FIGS. 1, 3 and 4. The housing 16 and outer cover 44 are formed of stainless steel and are as free as possible from cracks and/or crevices in which contaminants can be trapped.

The apparatus 10 may advantageously be used during the dispensing of molten thermoplastic material onto containers for food. It is very important that all items used in association with food be kept as clean as possible to prevent contamination of the food. Therefore, the apparatus 10 is designed in such a manner as to enable the apparatus to be frequently cleaned with a minimum of difficulty.

The cover assembly 32 must keep contaminants and clean-up liquids out of the tank 12. Any wash water and/or other cleaning liquids which enter the tank 12 will become steam at the 350° F. temperature at which the molten thermoplastic material is maintained in the tank. Of course, the presence of wash water and/or other cleaning liquids in the tank 12 will tend to contaminate the molten thermoplastic material in a manner which is particularly objectionable when the molten thermoplastic material is to be used in association with containers for food.

Figure 4:
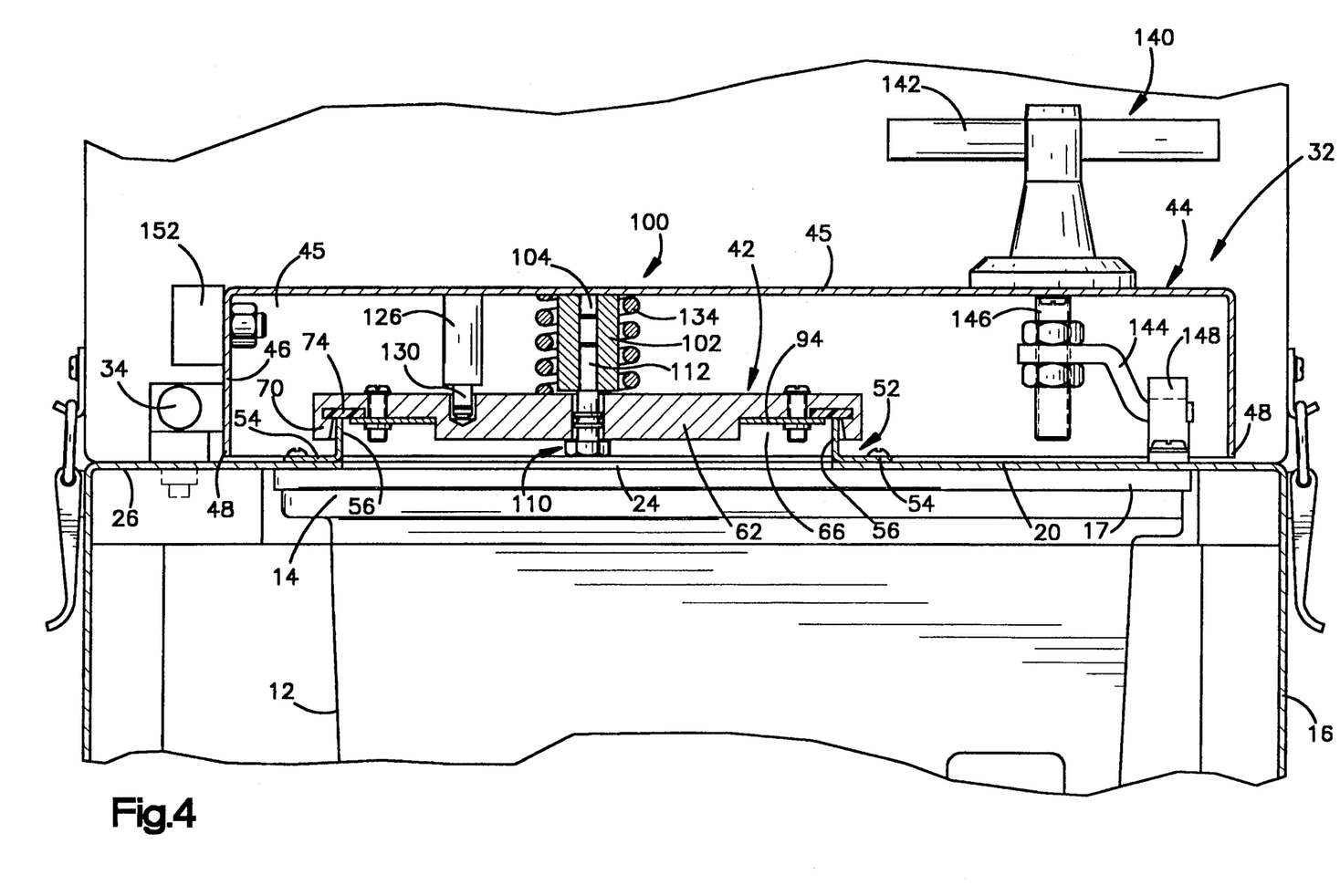
FIG. 4 is a fragmentary sectional view, taken generally along the line 4—4 of FIG. 3, illustrating the relationship of the cover assembly to a housing which encloses a tank for holding thermoplastic material.

Relatively little heat is transferred from the tank 12 to the outer cover 44. Therefore, the outer cover 44 is cool to the touch of an operator of the apparatus 10. The one-piece stainless steel outer cover 44 has a flat rectangular upper wall 45 (FIG. 4). A rectangular array of side walls 46 are formed as one-piece with and extend downwardly from the upper wall 45. The side walls 46 enclose the inner cover 42 and extend downwardly past the inner cover. The side walls 46 stop just short of engagement with the upper wall 20 of the housing 16.

The outer cover 44 cooperates with the housing 16 to block exposure of the inner cover 42 to wash water and/or other liquids during cleaning of the apparatus 10. However, lower edge portions 48 (FIG. 5) of the outer cover side walls 46 are spaced a slight distance from the upper wall 20 of the housing 16. The small gap between the lower edge portions 48 of the cover side walls 46 and the upper wall 20 of the housing 16 retards the transfer of heat to the outer cover 44. In addition, the gap avoids the formation of sharp corners or crevices in which contaminants can accumulate. However, it is possible for some wash water and/or other liquids to flow along the upper wall 20 of the housing 16 and under the outer cover 44. However, due to the shielding effect of the outer cover 44, the inner cover 42 is exposed to very little of the wash water and/or other cleaning liquids.

In accordance with a feature of the present invention, a rectangular rim 52 (FIGS. 3 and 5) extends along the periphery of the opening 24 in the upper wall 20 of the housing 16. The stainless steel rim 52 extends upwardly from the upper wall 20 of the housing 16 to prevent wash water and/or other liquids from flowing along the upper wall 20 of the housing and through the opening 24 into the tank 12. The rim 52 includes a horizontal flange 54 which is secured to the upper wall 20 of the housing 16 at a fluid tight joint. Therefore, wash water and/or other liquids cannot flow between the flange 54 and the upper wall 20 of the housing 16.

Figure 5:
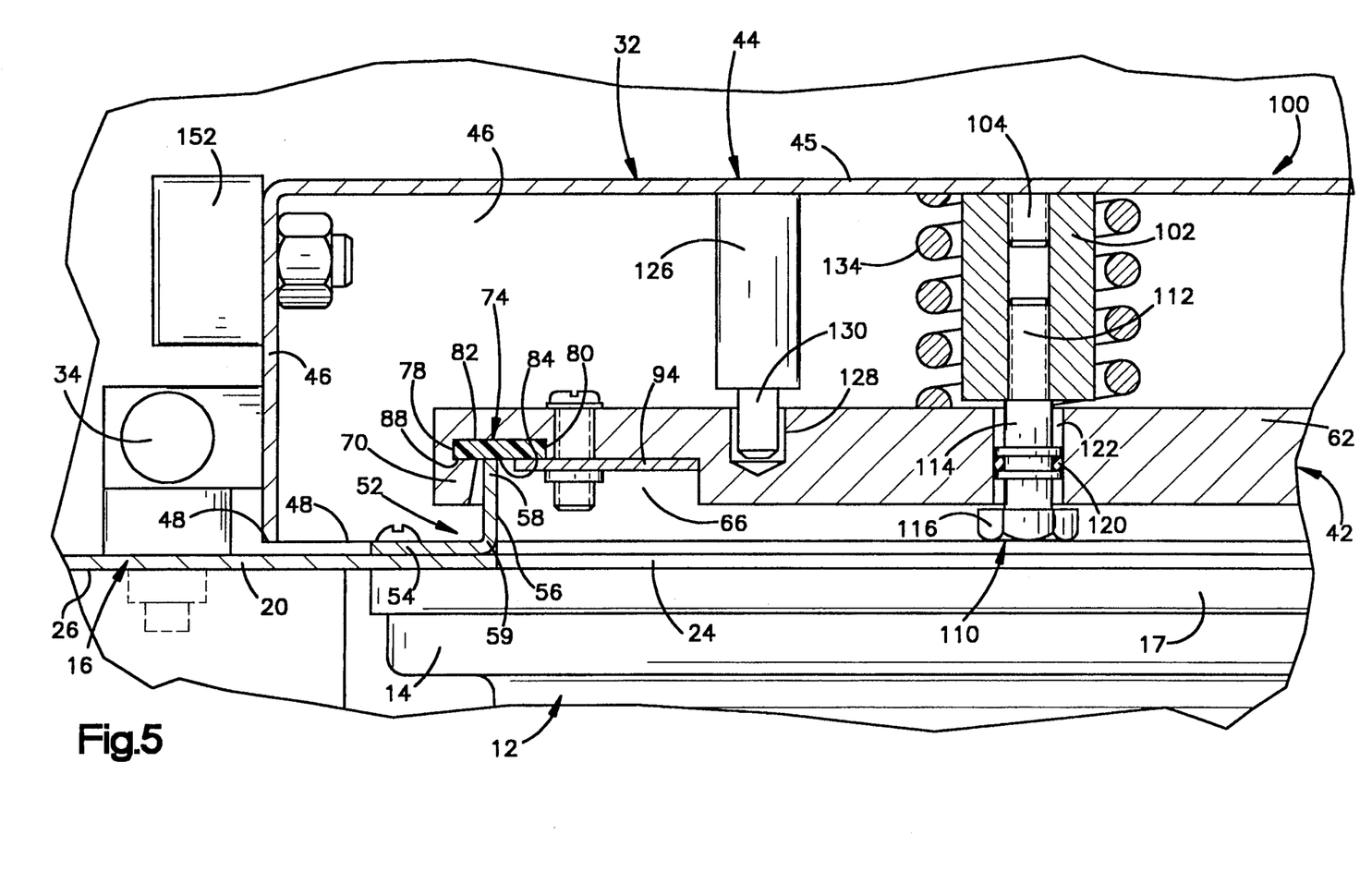
FIG. 5 is an enlarged fragmentary view of a portion of FIG. 4 and illustrating the manner in which an inner cover is mounted on an outer cover of the cover assembly and the manner in which a seal on the inner cover engages a rim on the housing.

The rim 52 has a vertical body section 56 (FIG. 5) which is formed as one piece with the flange 54. The vertical body section 56 has a rectangular configuration and extends upwardly from the edge of the opening 24 (FIGS. 3 and 5). The vertical body section 56 has an upper edge portion 58 (FIG. 5) which is sealingly engaged by the inner cover 42. Therefore, wash water and/or other liquids cannot flow over the upper edge portion 58 of the rim 52 when the inner cover 42 is closed, as shown in FIG. 5.

The body section 56 of the one-piece stainless steel rim 52 is connected with the flange 54 by an arcuate connector section 59 (FIG. 5). The connector section 59 is free of sharp corners and is readily cleaned. Therefore, contaminants and/or bacteria do not easily accumulate at the arcuate connector section 59. The rim 52 is made of stainless steel to enable it to withstand repeated cleanings with caustic cleaning solutions.

Any wash water which enters the space between the lower edge portion 48 of the vertical side walls 46 of outer cover 44 and the upper wall 20 of the housing 16 will flow inwardly into engagement with the rim 52. However, the rim 52 functions as a dam to block the wash water and/or other liquids from entering the opening 24. It should be understood that the rectangular rim 52 extends completely around the periphery of the opening 24 and is continuous so that wash water cannot pass through the rim 52.

The inner cover 42 sealingly engages the upper edge portion 58 of the rim 52. This prevents contaminants from entering the tank 12. In addition, the inner cover 42 sealingly engages the upper edge 58 of the rim 52 to prevent fumes from escaping from the tank 12.

The inner cover 42 includes a rectangular base 62 (FIGS. 3, 4 and 5). The base 62 of the inner cover 42 is formed from a single piece of cold rolled steel. The base 62 of the inner cover 42 is rugged and is capable of withstanding relatively large forces without breaking or being deformed. If desired, the base 62 could be formed of a material other than cold rolled steel.

A rectangular recess 66 (FIG. 5) is formed in the base 62 of the inner cover 42. The body section 56 of the rim 52 extends into the recess 66 when the inner cover 42 is in the closed condition. The base 62 of the inner cover 42 has a rectangular side wall 70 which defines the outer side of the recess 66 and extends downwardly along the upwardly extending body section 56 of the rim 52. The side wall 70 of the inner cover base 62 shields the upper portion of the rim 52 against engagement by contaminants. This tends to prevent entry of contaminants into the tank 12 during movement of the cover assembly 32 between the open and closed conditions.

A seal 74 is disposed in the recess 66 and engages the upper edge portion 58 of the rim 52 (FIG. 5). The seal 74 has a flat rectangular configuration and is coextensive with the upper edge portion 58 of the rim 52. Therefore, the rim 52 engages the seal 74 throughout the extent of the rim when the cover assembly 32 is in the closed condition of FIG. 5. The seal 74 prevents fumes from leaking out of the tank 12 and prevents contaminants from entering the tank 12 when the cover assembly 32 is in the closed condition.

The seal 74 has an outer edge portion 78 which forms a rectangle and an inner portion 80 which also forms a rectangle. The size of the rectangle formed by the outer edge portion 78 of the seal 74 is slightly larger than the rectangle formed by the body section 56 of the rim 52. The size of the rectangle formed by the inner side 80 of the seal 74 is smaller than the size of the rectangle formed by the body section 56 of the rim 52. The seal has a flat rectangular side surface 82 (FIG. 5) which is disposed in abutting sealing engagement with a flat inner side surface of the recess 66. An opposite side surface 84 of the seal is abuttingly engaged by the upper end portion 58 of the rim 52.

The outer portion of the seal 74 is received in a rectangular undercut 88 formed in the side wall 70 to hold the seal in place in the recess 66. A flat rectangular metal retainer plate 94 engages the inner portion of the seal 74 to further hold the seal in place in the recess 66. There is a slight gap between the rectangular outer edge portion of the plate 94 and the rectangular side wall 70. The body section 56 of the rim 52 extends through this gap into engagement with the seal 74 (FIG. 5). The side wall 70 and retainer plate 94 firmly hold the seal 74 in place in the recess 66 during repeated opening and closing of the cover assembly 32. If the seal 74 becomes worn, the retainer plate 94 can be disconnected from the base 62 and the seal replaced.

The inner cover 42 is connected with the outer cover 44 by a post assembly 100. During pivotal movement of the outer cover 44 about the hinges 34 and 36 (FIG. 3) between open and closed conditions, the post assembly 100 supports the inner cover 42 on the outer cover. The post assembly 100 includes an internally threaded hollow cylindrical spacer 102. A stud 104 (FIG. 5) extends downwardly from the flat upper wall 45 of the outer cover 44. External threads on the stud 104 engage internal threads in the spacer 102 to securely connect the spacer with the outer cover 44.

Figure 6:
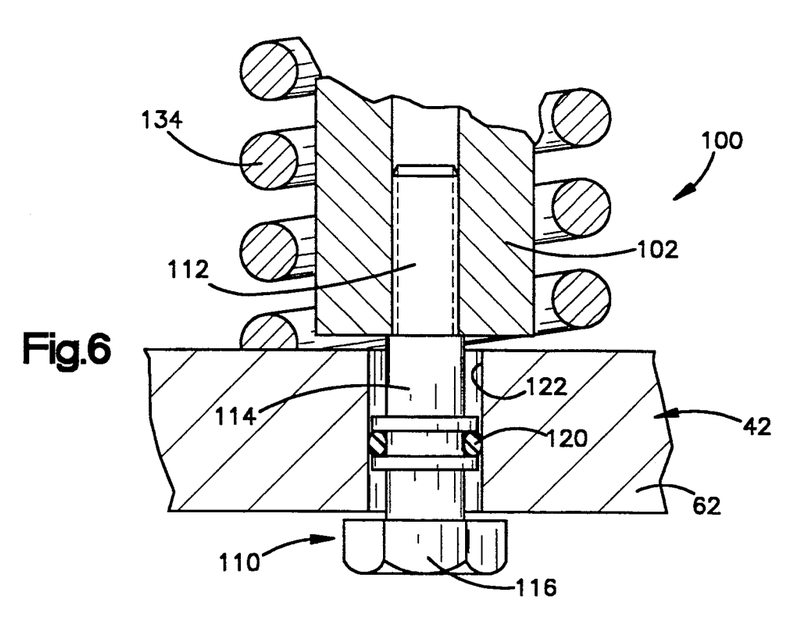
FIG. 6 is an enlarged fragmentary view of a portion of FIG. 5 and further illustrating the manner in which the inner cover is mounted on the outer cover.

A retaining bolt 110 (FIGS. 5 and 6) extends through the center of the inner cover 42. The retaining bolt 110 has a threaded end portion 112 which extends into engagement with internal threads in the spacer 102 (FIG. 6). A generally cylindrical shoulder 114 extends between the threaded end portion 112 of the retaining bolt and a head end portion 116 of the retaining bolt 110. The shoulder 114 has a larger diameter than the internally threaded opening in the spacer 102. When the retaining bolt 110 is threaded into the spacer 102, the shoulder 114 abuts the end of the spacer.

The distance between the head end portion 116 of the retaining bolt 110 and the end of the spacer 102 is greater than the thickness of the base 62 (FIG. 6). Therefore, the base 62 can rotate about the central axis of the retaining bolt 110 and spacer 102. The base 62 can also move axially along the retaining bolt 110 through a limited distance between head portion 116 and the lower end of the spacer 102. An O-ring seal 120 engages a cylindrical opening 122 in the base 62 of the inner cover 42 to prevent leakage of fumes from the tank 12 along the retaining bolt 110.

A locating pin 126 extends downwardly from the outer cover 44 into a cylindrical opening 128 formed in the base 62 of the inner cover 42. The opening 128 is larger than a cylindrical nose or end portion 130 of the locating pin 126 which is received in the opening. Therefore, the base 62 of the inner cover 42 is free to pivot through a limited distance about the retaining bolt 110. The distance through which the inner cover 42 can pivot about the retaining bolt 110 is limited by engagement of the end portion 130 of the locating pin 126 with the opening 128 formed in the base section 62 of the inner cover.

A helical coil biasing spring 134 urges the inner cover 42 away from the outer cover 44 toward the head end portion 116 of the retaining bolt 110 (FIG. 5). Prior to movement of the cover assembly 32 to the closed condition, the biasing spring 134 presses the inner cover 42 against the head end portion 116 of the retaining bolt 110. As the cover assembly 132 is closed, the upper edge portion 58 of the rim 52 engages the seal 74 and presses the inner cover 42 toward the outer cover 44 against the influence of the biasing spring 134. As this occurs, the inner cover 42 approaches, but does not engage, the inner end of the spacer 102 (FIGS. 5 and 6). Therefore, the force applied by the spring against the inner cover 42 is transmitted through the base 62 to the seal 74 (FIG. 5) and rim 52. Since the retaining bolt 110 extends through the center of the inner cover 42, a substantially uniform sealing action is obtained between the rim 52 and seal 74 throughout the length of the rim.

When the cover assembly 32 is in the closed condition of FIG. 5, the upper side of the base 62 of the inner cover 42 is separated from the lower end of the spacer 102. Therefore, if the fluid pressure in the tank 12 becomes excessive, the fluid pressure can move the inner cover 42 upwardly toward the outer cover 44 against the force of the spring 134 to vent the tank. It should be understood that the total range of movement of the inner cover 42 relative to the outer cover 44 in an axial direction along the retaining bolt 110 is relatively small. Thus, in one specific embodiment of the invention, the inner cover 42 had a total range of axial movement along the retaining bolt 110 of approximately 0.05 inches. It should be understood that the foregoing specific range of movement for the inner cover 42 has been set forth herein merely for purposes of clarity of description and not for purposes of limitation of the invention since it is contemplated that different distances may be used for different cover assemblies.

The outer cover 44 is held in the closed position of FIGS. 1 and 4 by a latch assembly 140. The latch assembly 140 includes a handle 142 (FIG. 4) which is rotatably mounted on the outer cover 44. A latch bar 144 extends outwardly from an externally threaded shaft 146 connected with the handle 142 (FIG. 4). The latch assembly 140 has been illustrated in FIG. 2 with the cover assembly 32 partially broken away to show the relationship of the inner cover 42 and latch assembly to the rim 52.

When the cover assembly 32 is in the closed condition of FIG. 4 and the latch assembly 140 is engaged, the latch bar 144 extends beneath a lock bar 148 which is fixedly connected to the frame of the housing 16. The latch bar 144 engages the lock bar 148 to hold the cover assembly 32 in the closed condition shown in FIG. 4. By rotation of the handle 142 in a counterclockwise direction (as viewed in FIG. 3), the latch bar 144 (FIG. 4) is moved out from beneath the lock bar 148 to release the cover assembly 32 for movement from the closed condition of FIG. 4 to the open condition.

When the cover assembly 32 is to be operated from the closed condition of FIG. 4 to an open condition to enable solid thermoplastic material to be placed into the tank 12, the handle 142 is rotated in a counterclockwise direction (as viewed in FIG. 3). This moves the latch bar 144 from beneath the lock bar 148 (FIG. 4). When the latch bar 144 has been disengaged from the lock bar 148, the cover assembly 32 is free to pivot about the hinges 34 and 36.

As the latch bar 144 is disengaged from the lock bar 148, the spring 134 causes the outer cover 44 to move away from the inner cover 42 by pivoting slightly about the hinges 34 and 36. As this occurs, the inner cover 42 remains stationary on the rim 52. However, the head end portion 116 (FIG. 5) of the retaining bolt 110 moves upwardly into abutting engagement with the lower side of the inner cover 42.

The handle 142 is then manually pulled to pivot the cover assembly 32 in a counterclockwise direction (as viewed in FIG. 4) about the hinges 34 and 36. As the cover assembly moves to the open condition, the inner cover 42 moves with the outer cover 44 and is supported by the post assembly 100. The locating pin 126 maintains the inner cover 42 in alignment with the outer cover 44.

When the cover assembly 32 reaches the fully open position, a stop member 152 (FIG. 4) on the outer cover 44 moves into abutting engagement with the housing 16 to block further movement of the cover assembly 32. This results in the cover assembly 32 being held in a fully open position in which the cover assembly extends upwardly and slopes slightly toward the left (as viewed in FIGS. 1 and 4). At this time, the opening 24 to the tank 12 is readily accessible and solid thermoplastic material can be moved through the opening into the tank 12.

When the cover assembly 32 is to be closed, the handle 42 is manually grasped and the cover is pivoted in a clockwise direction (as viewed in FIGS. 1 and 4) about the hinges 34 and 36. As the cover assembly 32 approaches the closed condition, the locating pin 126 maintains the inner cover 42 within a limited range in which the rim 52 can move into the recess 66. If the inner cover 42 has pivoted too far in one direction or the other relative to the post assembly 100, the rim 52 will engage the side wall 70 on the inner cover and cam or force the inner cover into alignment with the rim 52.

Continued downward movement of the cover assembly 32 toward the closed condition moves the seal 74 (FIG. 5) into engagement with the upper edge portion 58 of the rim 52. At this time, the base 62 of the inner cover 42 is disposed in abutting engagement with the head end portion 116 of the retaining bolt 110. The latch handle 142 is then rotated in a clockwise direction (as viewed in FIG. 3) to engage the latch bar 144 with the lock bar 148. As the latch bar 144 moves into engagement with the lock bar 148, the latch bar 144 is cammed downwardly (as viewed in FIG. 4). This moves the outer cover 44 downwardly toward the inner cover 42 and compresses the spring 134 between the inner and outer covers. The force applied against the base 62 of the inner cover 42 by the spring 134 provides for uniform sealing force between the rim 52 and the seal 74 throughout the extent of the rim.

Figure 7:
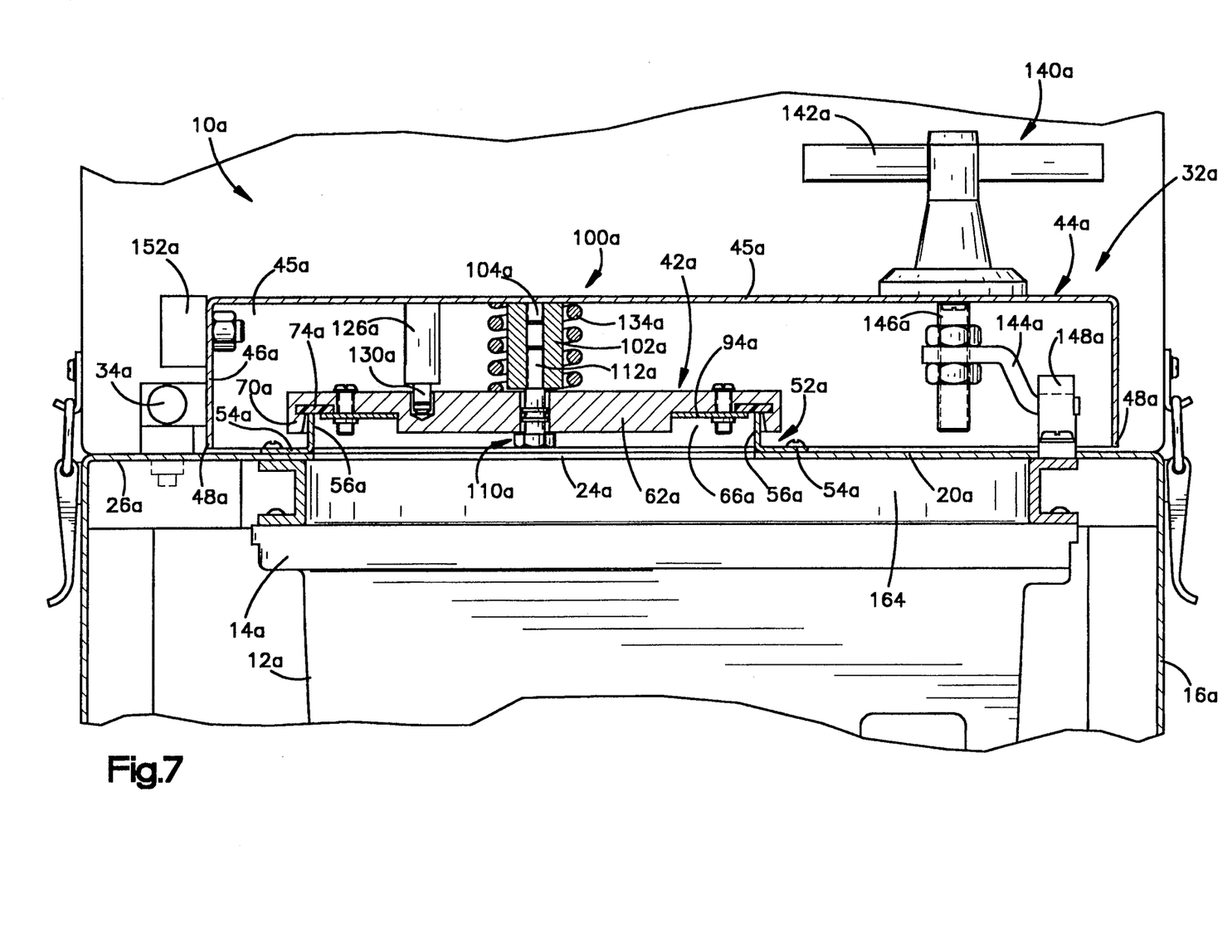
FIG. 7 is a fragmentary sectional view, generally similar to FIG. 4, of a second embodiment of the invention.

A second embodiment of the invention is illustrated in FIG. 7. Since the embodiment of the invention illustrated in FIG. 7 is generally similar to the embodiment of the invention illustrated in FIGS. 1–6, similar numerals will be utilized to designate similar components, the suffix letter "a" being added to the numerals of FIG. 7 to avoid confusion, An apparatus 10a (FIG. 7) is used to convert solid thermoplastic material to molten thermoplastic material. The apparatus 10a includes a tank 12a having an open upper end portion 14a. A stainless steel housing 16a encloses the tank 12a. An upper wall 20a of the housing 16a has a rectangular opening 24a which is smaller than the generally rectangular opening formed by the upper end portion 14a of the tank 12a.

An improved cover assembly 32a is pivotally connected with the housing 16a by a pair of hinge assemblies 34a. The hinge assemblies 34a allow the cover assembly 32a to be pivoted in a counterclockwise direction from the position shown in FIG. 7 to an open position. When the cover assembly 32a is in the open position, it extends upwardly from the upper wall 20a of the housing 16a to provide access to the opening 24a.

The cover assembly 32a includes an inner cover 42a which blocks the opening 24a when the cover assembly is in the closed condition shown in FIG. 7. An outer cover 44a cooperates with the housing 16a to enclose the inner cover 42a when the cover assembly 32a is in the closed condition.

In accordance with a feature of this embodiment of the invention, a one-piece rectangular spacer 164 is provided between the upper end portion 14a of the tank 12a and the upper wall 20a of the housing 16a. The rectangular spacer 164 is coextensive with the open upper end portion 14a of the tank 12a. A flat gasket seal (not shown) is provided between the spacer 164 and the upper wall 20a of the housing 16a. The spacer 164 eliminates the need for the isolator ring 17 of FIGS. 1–6.

The provision of the spacer 164 retards the transmission of heat from the tank 12a to the upper wall 20a of the housing 16a. Thus, in one specific embodiment of the invention, the use of the spacer 164 reduced the temperature of the upper wall 20a by 19° F. Of course, the specific amount by which the use of the spacer 164 reduces the temperature of the upper wall 20a of the housing 16a will depend upon many different factors, including the temperature of the molten thermoplastic material in the tank 12a and the axial extent of the spacer 164.

In view of the foregoing description, it is apparent that the present invention provides a new and improved apparatus 10 for use in converting solid thermoplastic material to molten thermoplastic material to facilitate application of the thermoplastic material to an article. The apparatus 10 includes a tank 12 which holds the thermoplastic material and is enclosed by a housing 16. A cover assembly 32 is connected with the housing 16 and is movable between an open condition and a closed condition blocking an open upper end portion 14 of the tank 12.

The cover assembly 32 includes an inner cover 42 which sealingly engages an upper end portion of a rim 52 which extends upwardly from an upper wall 20 of the housing 16. The rim 52 prevents wash water and/or other liquids from entering the tank 12. An outer cover 44 cooperates with the housing 16 to enclose the inner cover 42.

The inner cover 42 is pressed against the upper edge portion 58 of the rim 52 by a biasing spring 134. The inner cover 42 can move relative to the outer cover 44, against the influence of the biasing spring 134, to vent excessive fluid pressure in the tank 12. As the cover assembly 32 is closed, the inner cover 42 moves through a small distance relative to the outer cover 44 to facilitate positioning the inner cover on the rim 52 and to compress the spring 134 to provide a uniform sealing force between the inner cover and the rim.

Having described the invention, the following is claimed:

1. An apparatus for use in converting solid thermoplastic material to molten thermoplastic material to facilitate application of the thermoplastic material to an article, said apparatus comprising tank means for receiving the thermoplastic material, said tank means having an open upper end portion through which solid thermoplastic material moves into said tank means, housing means for at least partially enclosing said tank means, said housing means having an upper wall with an opening through which solid thermoplastic material moves into said tank means, a rim extending along the periphery of the opening in said upper wall of said housing and extending upwardly from said upper wall of said housing, said rim having an upper edge portion which is disposed above said upper wall of said housing to enable said rim to block liquid from flowing along said upper wall of said housing and through the opening in said upper wall of said housing into said tank means, and cover means connected with said housing means and movable between an open condition and a closed condition blocking the open upper end portion of said tank means, said cover means including an inner cover which sealingly engages said upper edge portion of said rim when said cover means is in the closed condition and an outer cover which cooperates with said housing means to enclose said inner cover, said outer cover having an upper wall which overlies said inner cover and extends outward of a peripheral edge portion of said inner cover throughout the extent of the peripheral edge portion of said inner cover, said outer cover having a continuous array of side walls which extends downward from said upper wall and extends along the peripheral edge portion of said inner cover throughout the extent of the peripheral edge portion of said inner cover.

2. An apparatus as set forth in claim 1 wherein said continuous array of side walls extends downward past said upper edge of said rim portion and extends along the upper edge of said rim portion throughout the extent of said upper edge of said rim portion.

3. An apparatus as set forth in claim 2 wherein said continuous array of side walls has a lower edge which extends completely around said rim and is spaced from said upper wall of said housing means by a distance which is less than a distance which the upper edge portion of said rim is disposed above said upper wall of said housing, said lower edge of said array of side walls cooperating with said upper wall of said housing means to define an open space having an upward extent which is less than the upward extent of said rim.

4. An apparatus as set forth in claim 1 further including latch means for holding said outer cover against movement relative to said housing means, at least a portion of said latch means being disposed between said inner cover and said array of side walls which extend downward from said upper wall of said outer cover.

5. An apparatus as set forth in claim 4 wherein said array of side walls which extend downward from said upper wall of said outer cover has a lower edge portion which is disposed adjacent to and is spaced from said upper wall of said housing means, said lower edge portion of said array of side walls cooperating with said upper wall of said housing means to define an open space having an upward extent which is less than the upward extent of said rim.

6. An apparatus as set forth in claim 1 further including a support post extending between said inner and outer covers for pivotally supporting said inner cover when said cover means is in the open condition and a locating pin extending between said inner and outer covers for limiting pivotal movement of said inner cover about said support post when said cover means is in the open condition.

7. An apparatus as set forth in claim 1 further including latch means for holding said outer cover against movement relative to said housing means and spring means disposed between said inner and outer covers for pressing said inner cover against said upper edge portion of said rim when Said cover means is in the closed condition.

8. An apparatus as set forth in claim 1 further including a support post extending between said inner and outer covers for supporting said inner cover when said cover means is in the open condition and a locating pin extending between said inner and outer covers for limiting pivotal movement of said inner cover about said support post when said cover means is in the open condition, said locating pin cooperating with said inner cover to align said inner cover with said rim during movement of said cover means from the open condition to the closed condition.

9. An apparatus as set forth in claim 1 wherein said inner cover includes surface means for defining a recess in said inner cover and seal means disposed in said recess, said upper edge portion of said rim being disposed in said recess in said inner cover in abutting engagement with said seal means when said cover means is in the closed condition.

10. An apparatus as set forth in claim 9 further including spring means for applying force against an upper side of said inner cover to press said seal means against said upper edge portion of said rim when said cover means is in the closed condition, said inner cover being movable against the influence of said spring means to vent excessive fluid pressure from said tank means when said cover means is in the closed condition.

11. An apparatus as set forth in claim 10 further including post means extending between said inner and outer covers for interconnecting said inner and outer covers, said spring means being operable to move said inner cover along said post means in a direction away from said outer cover upon movement of said cover means from the closed condition to the open condition, said inner cover being movable along said post means in a direction toward said outer cover against the influence of said spring means by force applied against said seal means by said upper edge portion of said rim means during movement of said cover means from the open condition to the closed condition.

12. An apparatus as set forth in claim 1 further including spacer means disposed between the upper end portion of said tank means and said upper wall of said housing to retard transmission of heat from said tank means to said upper wall of said housing.

13. An apparatus for use in converting solid thermoplastic material to molten thermoplastic material to facilitate application of the thermoplastic material to an article, said apparatus comprising tank means for receiving the thermoplastic material, said tank means having an open upper end portion through which solid thermoplastic material modes into said tank means, housing means for at least partially enclosing said tank means, said housing means having an upper wall with an opening through which solid thermoplastic material moves into said tank means, a rim extending along the periphery of the opening in said upper wall of said housing and extending upwardly from said upper wall of said housing, said rim having an upper edge portion which is disposed above said upper wall of said housing to enable said rim to block liquid from flowing along said upper wall of said housing and through the opening in said upper wall of said housing into said tank means, and cover means connected with said housing means and movable between an open condition and a closed condition blocking the open upper end portion of said tank means, said cover means including an inner cover which sealingly engages said upper edge portion of said rim when said cover means is in the closed condition, an outer cover which cooperates with said housing means to enclose said inner cover, a support post extending between said inner and outer covers for pivotally supporting said inner cover when said cover means is in the open condition, and a locating pin spaced from said support post and extending between said inner and outer covers for limiting pivotal movement of said inner cover about said support post when said cover means is in the open condition.

14. An apparatus as set forth in claim 13 wherein said locating pin has a central axis which extends parallel to and is spaced from a central axis of said support post.

15. An apparatus as set forth in claim 14 further including surface means fixedly connected with a first one of said inner and outer covers for defining a recess into which an end portion of said locating pin extends, said surface means being engageable with said locating pin to block pivotal movement of said inner cover about said support post when said cover means is in the open condition.

16. An apparatus as set forth in claim 13 wherein said inner cover includes first surface means for defining a first opening which extends through said inner cover, said support post being at least partially disposed in said first opening in said inner cover, said inner cover including second surface means for defining a second opening which is spaced from said first opening and extends only part way through said inner cover, said locating pin being at least partially disposed in said second opening in said inner cover.

17. An apparatus as set forth in claim 13 further including latch means for holding said outer cover against movement relative to said housing means, said latch means and said inner cover being at least partially enclosed by said outer cover and said housing means when said cover means is in the closed condition.

18. An apparatus as set forth in claim 13 wherein said outer cover includes an upper wall which is connected with said inner cover by said support post and a side wall which extends downwardly from said upper wall of said outer cover past said inner cover and extends around said inner cover and around said rim throughout the extent of said rim when said cover means is in the closed condition, said side wall of said outer cover having a lower edge portion which is disposed adjacent to and is spaced from said upper wall of said housing means, said side wall of said outer cover cooperating with said housing means to define an open space which has an upward extent which is less than the upward extent of said rim.

19. An apparatus as set forth in claim 13 further including spacer means disposed between the upper end portion of said tank means and said upper wall of said housing to retard transmission of heat from said tank means to said upper wall of said housing.

20. An apparatus as set forth in claim 13 wherein said upper edge portion of said rim includes a linear portion, said inner cover having a linear edge portion which engages said linear portion of said upper edge portion of said rim when said cover means is in the closed condition, said locating pin cooperating with said inner cover to align said linear edge portion of said inner cover with said linear portion of said upper edge of said rim during movement of said cover means from the open condition to the closed condition.

21. An apparatus as set forth in claim 13 wherein said inner cover has a peripheral edge portion with a rectangular configuration, said outer cover having a peripheral side wall which extends around said peripheral edge portion of said inner cover and which has a rectangular configuration, said locating pin cooperating with said inner and outer covers to align the rectangular peripheral edge portion of said inner cover with said rectangular side wall of said outer cover when said cover means is in the open condition.

22. An apparatus as set forth in claim 21 wherein said upper edge portion of said rim has a rectangular configuration, said locating pin cooperating with said inner and outer covers to align the rectangular peripheral edge portion of said inner cover with said rectangular upper edge portion of said rim during movement of said cover means from the open condition to the closed condition.

23. An apparatus for use in converting solid thermoplastic material to molten thermoplastic material to facilitate application of the thermoplastic material to an article, said apparatus comprising tank means for receiving the thermoplastic material, said tank means having an open upper end portion through which solid thermoplastic material moves into said tank means, housing means for at least partially enclosing said tank means, said housing means having an upper wall with an opening through which solid thermoplastic material moves into said tank means, a rim extending along the periphery of the opening in said upper wall of said housing and extending upwardly from said upper wall of said housing, said rim having an upper edge portion which is disposed above said upper wall of said housing to enable said rim to block liquid from flowing along said upper wall of said housing and through the opening in said upper wall of said housing into said tank means, cover means connected with said housing means and movable between an open condition and a closed condition blocking the open upper end portion of said tank means, said cover means including an inner cover which sealingly engages said upper edge portion of said rim when said cover means is in the closed condition and an outer cover which cooperates with said housing means to enclose said inner cover, said outer cover having an upper wall which overlies said inner cover and a side wall which extends downwardly from said upper wall past said upper edge portion of said rim, said side wall extending completely around said inner cover and said rim and having a lower edge portion which is disposed adjacent to and is spaced from said upper wall of said housing means, and latch means for holding said inner and outer covers against movement relative to said housing means when said cover means is in the closed condition, said latch means including a first latch member connected to said upper wall of said housing means, said first latch member being disposed between said rim and said side wall of said outer cover when said cover means is in the closed condition, said latch means including a second latch member connected with said upper wall of said outer cover and movable relative to said outer cover between a disengaged position in which said second latch member is spaced from said first latch member and an engaged position in which said second latch member engages said first latch member, said second latch member being disposed in engagement with a portion of said first latch member which is located above the lower edge of said side wall of said outer cover at a location between said inner cover and said side wall of said outer cover when said second latch member is in the engaged position.

24. An apparatus as set forth in claim 23 further including a support post extending between said inner and outer covers for pivotally supporting said inner cover when said cover means is in the open condition and a locating pin spaced from said support post and extending between said inner and outer covers for limiting pivotal movement of said inner cover about said support post when said cover means is in the open condition.

* * * * *

UNITED STATES PATENT AND TRADEMARK OFFICE
CERTIFICATE OF CORRECTION

PATENT NO. : 5,353,945
DATED : October 11, 1994
INVENTOR(S) : Paul S. Frates, Charles P. Ganzer, Kenneth E. Rothrauff, and Luis F. Pareja It is certified that error appears in the above-indentified patent and that said Letters Patent is hereby corrected as shown below:

Column 10, line 25, change "Said" to --said--.

Column 11, line 9, change "modes" to --moves--.

Signed and Sealed this

Seventh Day of February, 1995

Attest:

BRUCE LEHMAN

*Attesting Officer*  *Commissioner of Patents and Trademarks*